W. D. Stroud.
Winnebago-Seeder.
No. 119,285.  Patented Sep. 26, 1871.
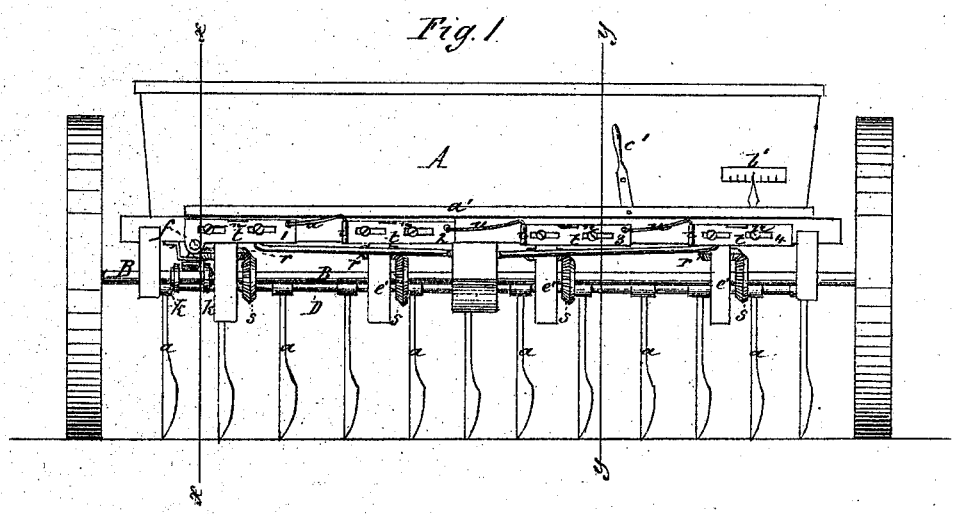
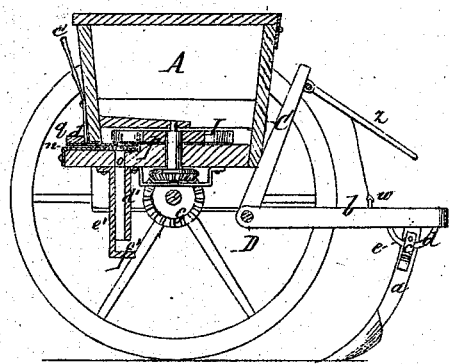
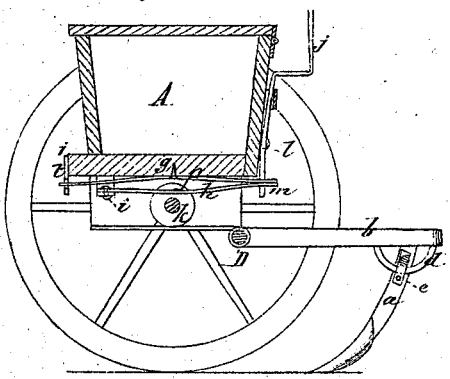
Witnesses.
W. D. Stroud, Inventor.
by Theodore Mungen,
his Attorney.

2 Sheets--Sheet 2.

W. D. Stroud.
Winnebago-Seeder

No. 119,285.                    Patented Sep. 26, 1871.

Witnesses.                      Inventor.

119,285

UNITED STATES PATENT OFFICE.

WILLIAM D. STROUD, OF OSHKOSH, WISCONSIN.

IMPROVEMENT IN COMBINED SEEDERS AND CULTIVATORS.

Specification forming part of Letters Patent No. 119,285, dated September 26, 1871; antedated September 9, 1871.

*To all whom it may concern:*

Be it known that I, WILLIAM D. STROUD, of Oshkosh, in the county of Winnebago and State of Wisconsin, have invented certain new and useful Improvements in my Combined Seeder and Cultivator patented March 22, 1870; and I hereby declare the following to be a full, clear, and exact description of the same, reference being had to the accompanying drawing making a part of this specification, in which—

Figure 4:
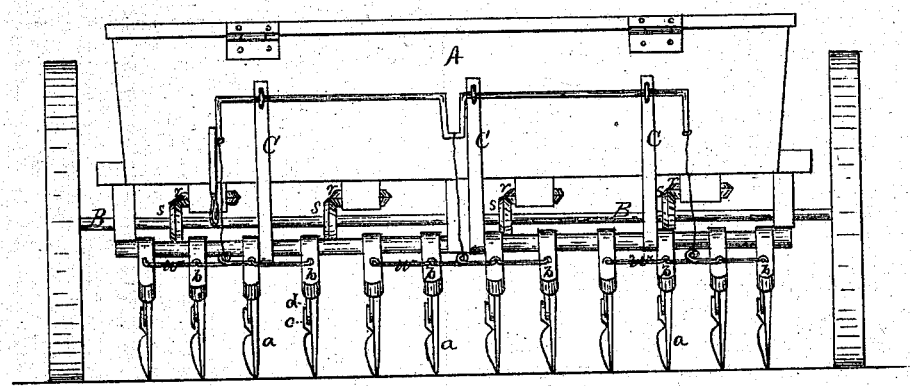
Figure 5:

Figure 1 is a front elevation of the machine. Fig. 2 is a transverse section through the line $y$ $y$ in Fig. 1. Fig. 3 is a transverse section through line $x$ $x$ in Fig. 1. Fig. 4 is a rear elevation of the machine. Fig. 5 is a perspective view of the discharge-tube and scatterer.

My invention relates to certain improvements in my combined seeder and cultivator patented March 22, 1870; and consists: Firstly, of the arrangement of three levers in combination with the seed-box, driving-shaft, and cut-off attachment of the seeding-machine in such a manner that two of the levers are operated by the third so as to throw the machine in and out of gear and to open and close the discharge-orifices at the same time by moving the valves of the cut-off attachment. Secondly, in combining with the seed-box a cut-off attachment constructed in sections and connected together in such a manner that one section may be disconnected from the rest, or they may be all disconnected one from another in order that part of the valves may be closed while the others are operated for finishing up lands that do not require the whole width of the machine to sow them. Thirdly, of the arrangement of a set of linked rods secured to the lag-bars of the machine in combination with a cranked lever, for the purpose of hoisting the cultivator-teeth over obstacles and for keeping them elevated when not in use. Fourthly, of a set of gauge-valves secured to a bar provided with an indicator and operated by a lever, in combination with the seed-cups of the machine, for the purpose of regulating the quantity of seed to be sown per acre. Fifthly, of a shank provided with a semicircular fluted projection, in combination with the discharge-tube of the seeder, for the purpose of scattering the seed broadcast.

In the drawing, the lever $f$ has its fulcrum on the screw $g$ in the bottom of the seed-box A. Its "weight end" is secured to section 1 of the cut-off attachment. The lever $h$ has its fulcrum between the shoulders $k$ on the driving-shaft B of the machine, and its weight end attached to a bolt, $i$, in a metal loop secured to the bottom of the seed-box A. The lever $j$ has its fulcrum on the bolt $l$ in the side of the seed-box A. The weight end of the lever $j$ enters a hole in the power ends of the levers $f$ and $h$ at $m$. The valves $n$ of the cut-off attachment are placed directly over the discharge-orifices $o$ and far enough beneath the bottom $p$ of the seed-cups to permit the gauge-valves $q$ to be introduced between them. The gear-wheels $r$ of the agitators are placed far enough to the right of the gear-wheels $s$ on the driving-shaft B to prevent their teeth from engaging. While the valves $n$ and gear-wheels $r$ and $s$ occupy the positions just described the power end of the lever $j$ inclines to the right, and the machine is out of gear and the discharge-orifices $o$ closed. By moving the lever $j$ to the left the seed-box A slides to the left on the driving-shaft B and causes the teeth of the wheels $r$ to mesh with those of the wheels $s$, while at the same time the valves $n$ are moved to the left of the discharge-orifices $o$, leaving the latter open. The valves $n$ are attached to slotted metallic plates $t$ secured to the front edge of the bottom of the seed-box A by screws passing through the slots in said plates, and on which they slide. The plates $t$ are provided with hooked rods $u$ and eyes $v$, by which the sections 1 2 3 4 of the cut-off attachment are connected. When it is desired to finish up a land that does not require the whole width of the machine to sow it, the machine may be thrown out of gear, thereby closing all of the discharge-orifices $o$, and one or more, if necessary, of the sections 1 2 3 4 disconnected by unhitching the hooked rods $u$, and only a part of them used. By this construction of cut-off attachment a waste of seed is avoided which would otherwise occur, as in finishing up lands a portion of the land would be sown the second time. The linked rods $w$ are secured to the lag-bars $b$ by staples driven through the links of the rods $w$ into the tops of the lag-bars. The lag-bars $b$ are grouped in sections of four each for convenience, and each section is connected by a chain to the cranked lever $z$, so that the cultivator-teeth $a$ may be raised to avoid an obstacle, or may be kept elevated when not in use. The cranked lever $z$ works in bearings in the braces C secured to the rear of the seed-box A and to the shaft D, to which also the lag-bars $b$ are secured. The gauge-valves $q$ are secured to the bar $a'$, which is placed in front and upon the bottom board of the seed-box A, and work between the bottom $p$ of the seed-cups and the valves $n$ of the cut-off attachment. The needle of an indicator, $b'$, is secured to the bar $a'$, and the scale of the same is secured to the front of the seed-box A. A lever, $c'$, is connected with the bar $a'$, and, secured to the front of the seed-box A, is used to operate the gauge-valves $q$ and indicator $b'$. The gauge-valves $q$ gauge the size of the discharge-orifices $o$, and the indicator $b'$ indicates the quantity of seed per acre. The discharge-tube $d'$ is secured to a broad shank $e'$ provided with a semicircular fluted projection, $f'$, at its bottom. The shank $e'$ is secured to the bottom of the seed-box A, so that the discharge-tube $d'$ will come directly under the discharge-orifice $o$ and the seed from the seed-cups will pass through the tube $d'$ and fall upon the fluted projection $f'$ on the shank $e'$, and be scattered broadcast. The arms I of the agitators are curved, and made of round wire so as not to cut the grain.

Having thus described my invention, what I claim as new, and desire to secure by Letters Patent, is—

1. The levers $f$, $h$, and $j$, arranged as described, in combination with the seed-box A, driving-shaft B, and cut-off attachment $n\ t\ u\ v\ 1\ 2\ 3\ 4$, in the manner and for the purpose hereinbefore specified.

2. In combination with the seed-box A of a seeding-machine, a cut-off attachment constructed in sections, as 1 2 3 4, and composed of the slotted plates $t$ provided with valves $n$, hooked rods $u$, and eyes $v$, all arranged as described, for the purpose hereinbefore specified.

3. The gauge-valves $q$ secured to the bar $a'$, provided with the needle of the indicator $b'$, and operated by the lever $c'$, in combination with the seed-cups of the seeding-machine, as and for the purpose specified.

In testimony that I claim the foregoing improvements in seeders and cultivators as above described I have hereunto set my hand and seal this 28th day of December, 1870.

WILLIAM D. STROUD. [L. S.]

Witnesses:
   I. M. STROUD,
   CHR. SARAU, Jr.